United States Patent
Lazarovits

(10) Patent No.: US 10,500,796 B1
(45) Date of Patent: Dec. 10, 2019

(54) DYNAMIC TISSUE MICROFABRICATION THROUGH DIGITAL PHOTOLITHOGRAPHY SYSTEM AND METHODS

(71) Applicant: Isac Lazarovits, Woodland Hills, CA (US)

(72) Inventor: Isac Lazarovits, Woodland Hills, CA (US)

( * ) Notice: Subject to any disclaimer, the term of this patent is extended or adjusted under 35 U.S.C. 154(b) by 245 days.

(21) Appl. No.: 15/491,956

(22) Filed: Apr. 19, 2017

Related U.S. Application Data

(60) Provisional application No. 62/325,109, filed on Apr. 20, 2016.

(51) Int. Cl.

| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *B33Y 80/00* | (2015.01) |
| *B29K 105/00* | (2006.01) |
| *B29K 105/16* | (2006.01) |

(52) U.S. Cl.
CPC ...... *B29C 67/0066* (2013.01); *B29C 67/0088* (2013.01); *B33Y 10/00* (2014.12); *B33Y 30/00* (2014.12); *B33Y 50/02* (2014.12); *B33Y 80/00* (2014.12); *B29K 2105/0058* (2013.01); *B29K 2105/16* (2013.01)

(58) Field of Classification Search
CPC ..... B29C 67/0066; B33Y 10/00; B33Y 30/00; B33Y 50/02
See application file for complete search history.

(56) References Cited

U.S. PATENT DOCUMENTS

| | | | |
|---|---|---|---|
| 6,416,190 B1 * | 7/2002 | Grier | G02B 21/32 359/601 |
| 7,088,432 B2 * | 8/2006 | Zhang | G03F 7/0037 355/77 |
| 7,568,904 B2 | 8/2009 | Koyagi et al. | |
| 9,186,847 B2 | 11/2015 | Fruth et al. | |

OTHER PUBLICATIONS

Truby, Ryan L., and Jennifer A. Lewis. "Printing soft matter in three dimensions." Nature 540.7633 (2016): 371-378.

(Continued)

*Primary Examiner* — Jacob T Minskey
*Assistant Examiner* — Melody Tsui
(74) *Attorney, Agent, or Firm* — Edwin Tarver

(57) ABSTRACT

An additive manufacturing system and method for the controlled positioning of particles within the various layers of an object to be fabricated. The system and method employs holographic optical tweezers technology utilizing digitally controlled optical traps to manipulate cells or particles in conjunction with digital light-based additive manufacturing to provide control over the composition of an object to be fabricated. The method uses an optical tweezers apparatus to place desired cells or particles in desired locations prior to a patterned exposure that polymerizes surrounding resin. Thus, providing users a capability of fabricating three dimensional hierarchical systems combining features spanning from the macro to microscopic scale intricacies.

16 Claims, 19 Drawing Sheets

(56) References Cited

OTHER PUBLICATIONS

Homan, Kimberly A., et al. "Bioprinting of 3D convoluted renal proximal tubules on perfusable chips." Scientific reports 6 (2016).
Kolesky, David B., et al. "Three dimensional bioprinting of thick vascularized tissues." Proceedings of the National Academy of Sciences113.12 (2016): 3179-3184.
Ruffner, David B., and David G. Grier. "Universal, strong and long-ranged trapping by optical conveyors," Optics express 22.22 (2014): 26834-26843.
Pyo, Sang-Hym, et al. "Continuous optical 3D printing of green aliphatic polyurethanes." ACS applied materials & interfaces 9.1 (2016): 836-844.
Zhu, Wei, et al, "Direct 3D bioprinting of prevascularized tissue constructs with complex microarchitecture," Biomaterials 124 (2017): 106-115.

* cited by examiner

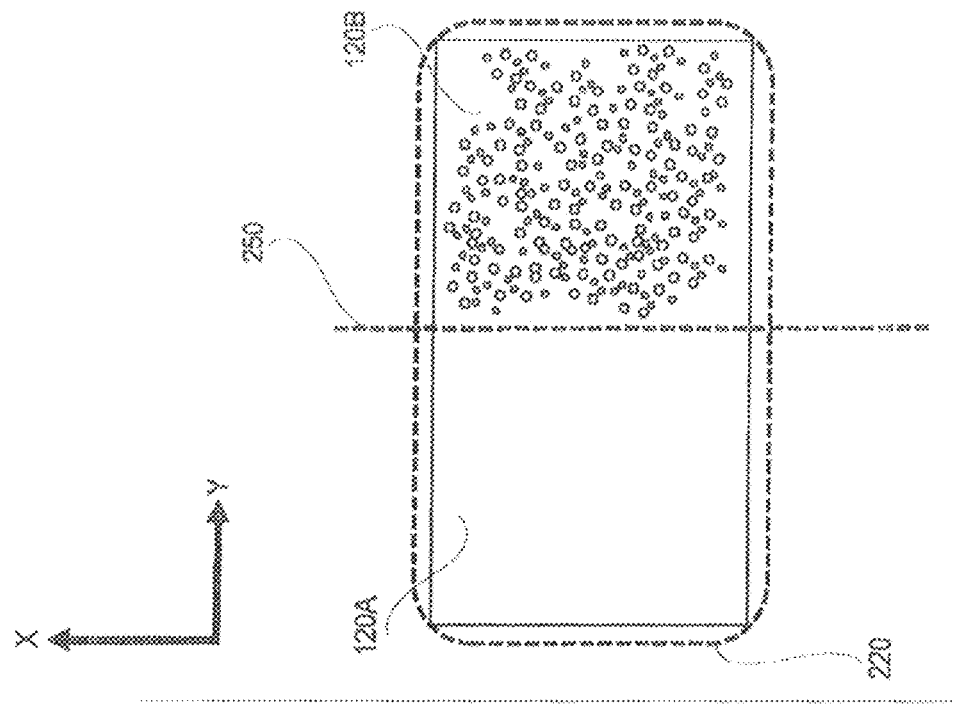
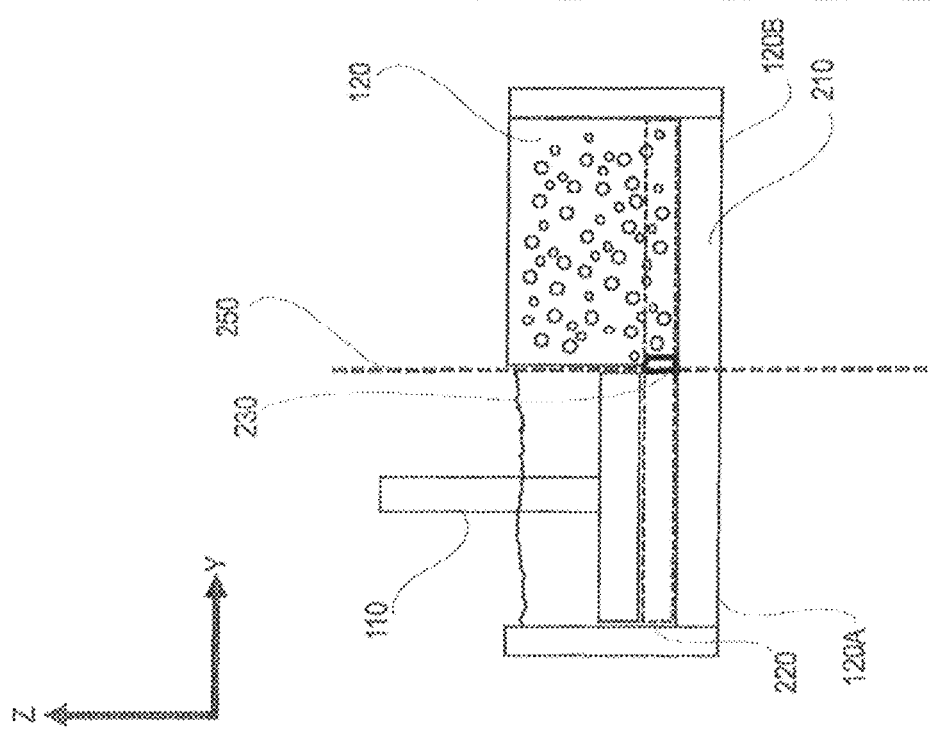
FIG. 6A
FIG. 6B

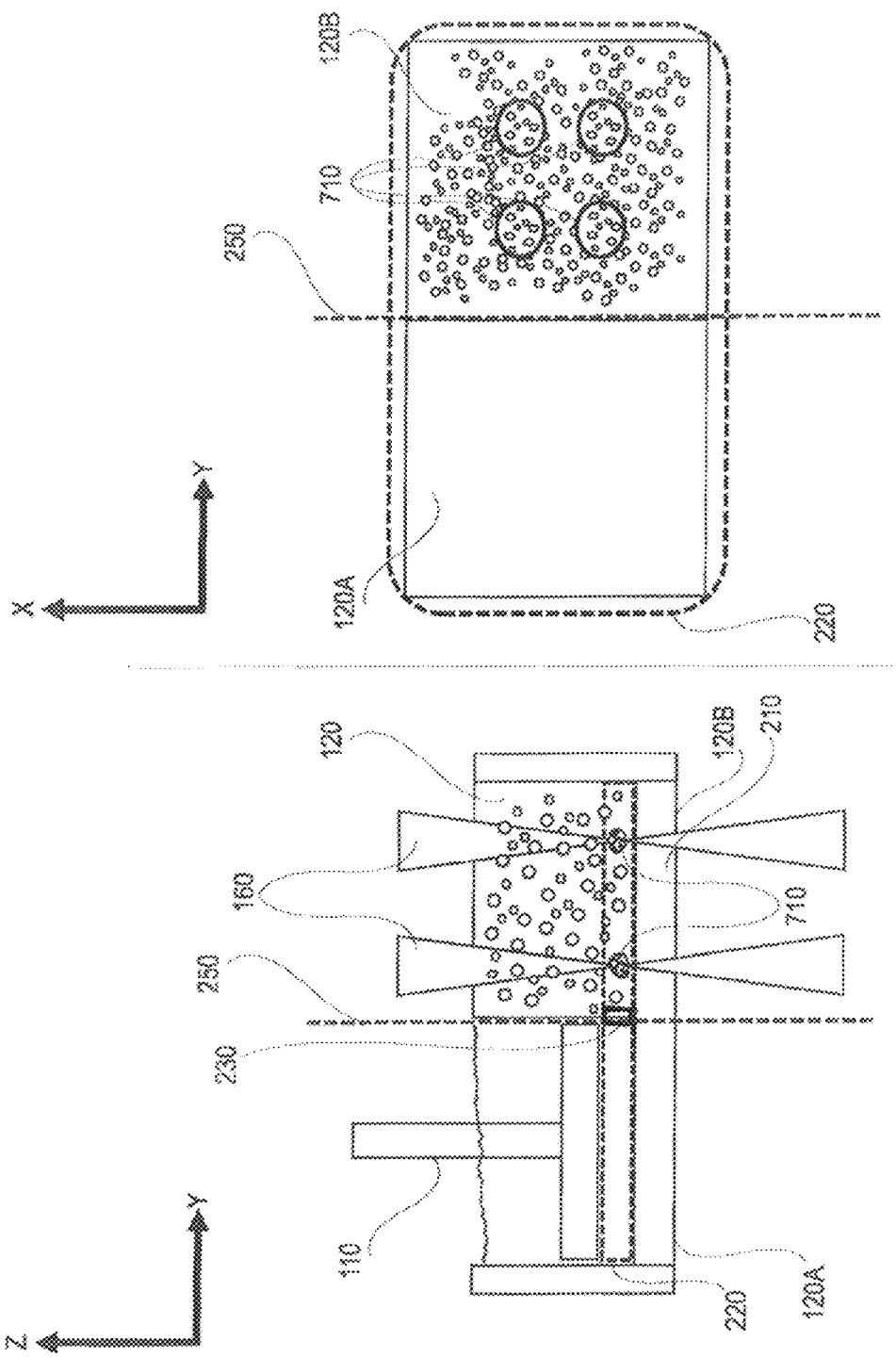

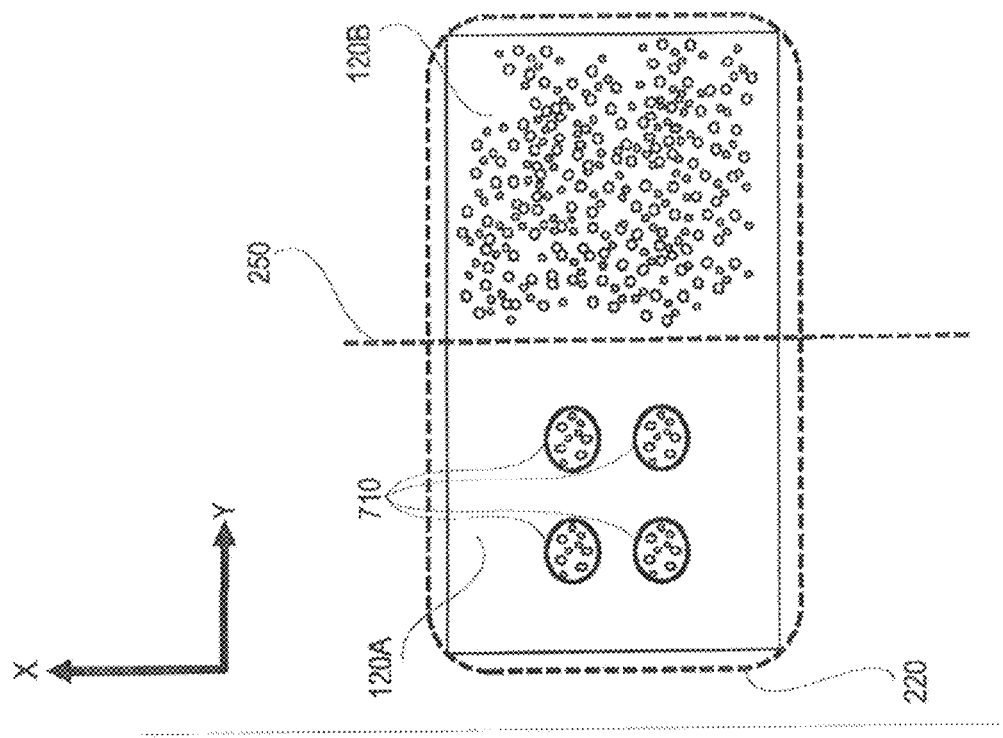
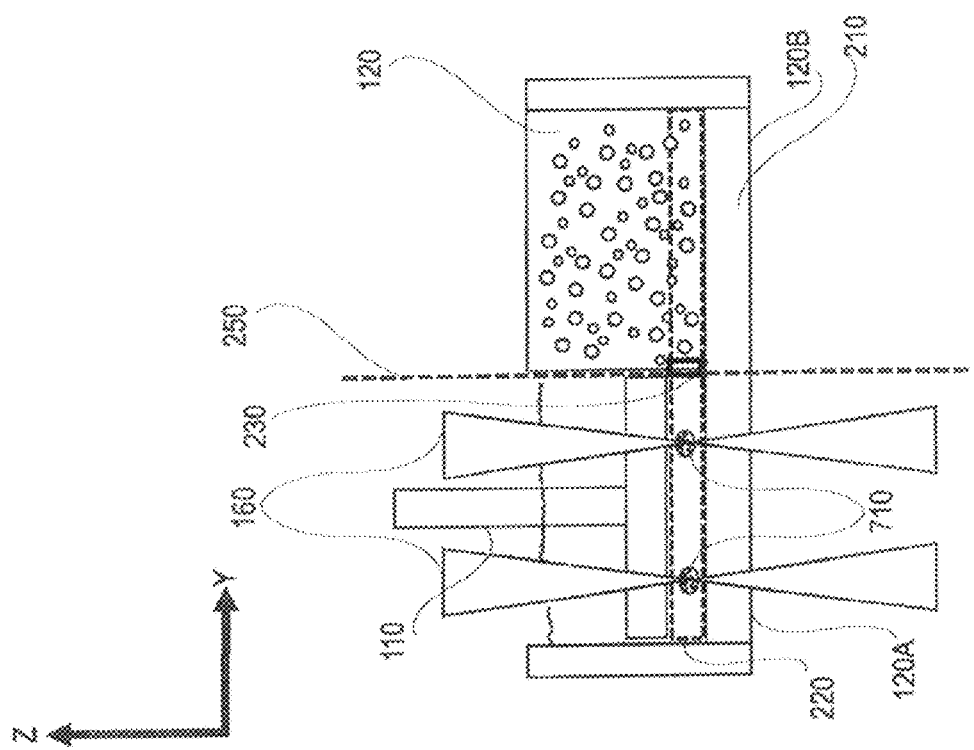

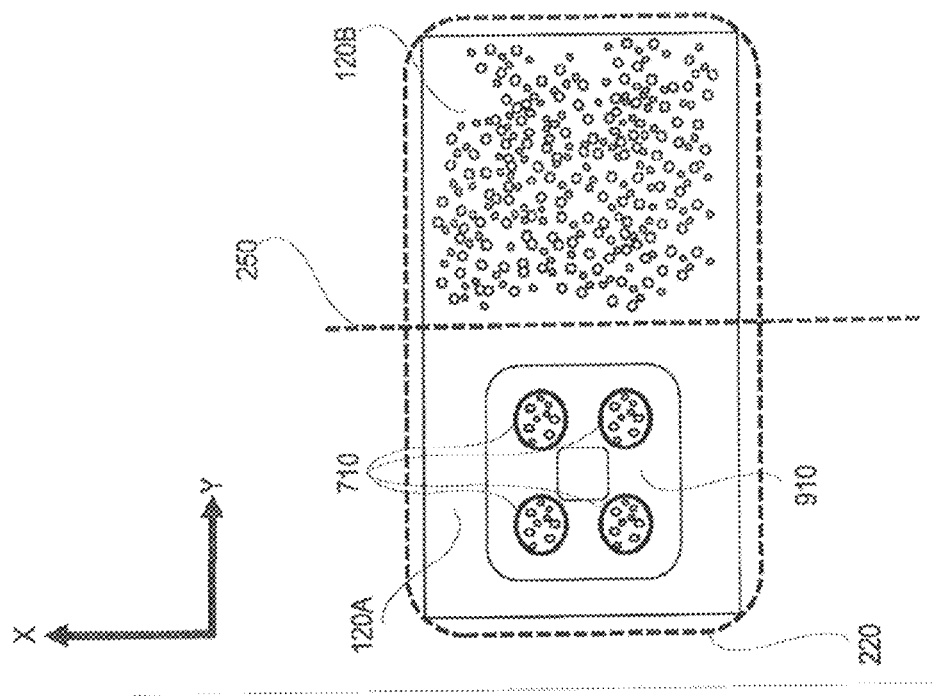
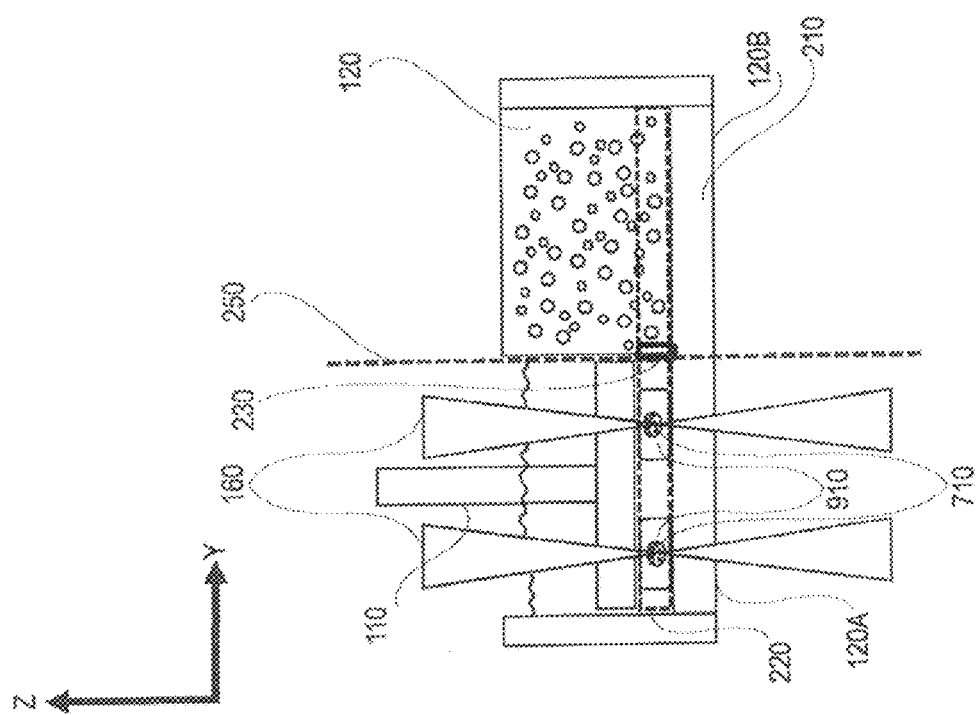
FIG. 9A
FIG. 9B

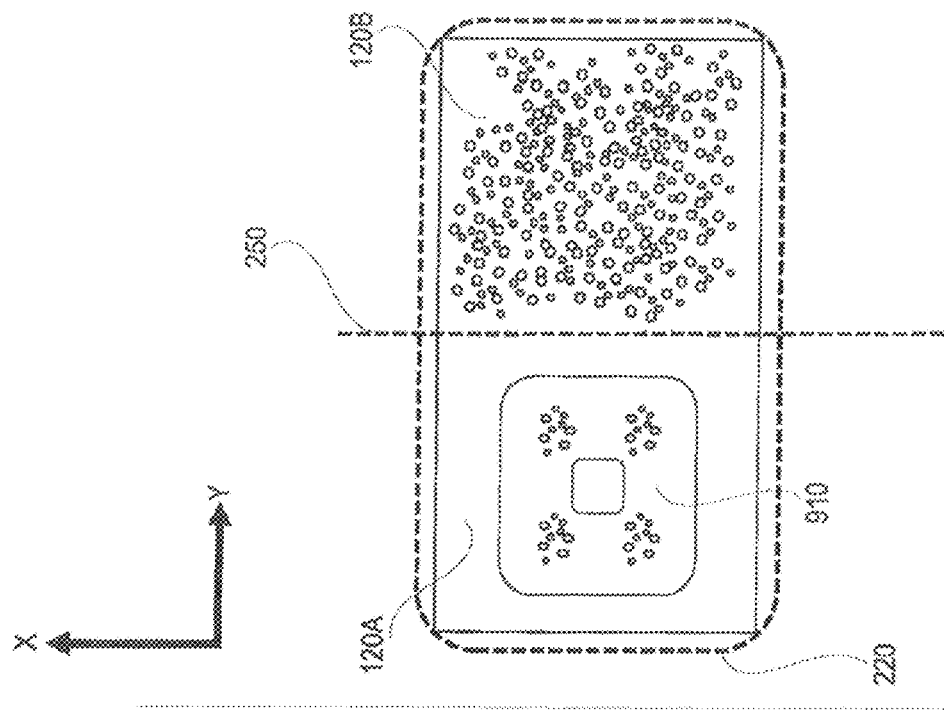
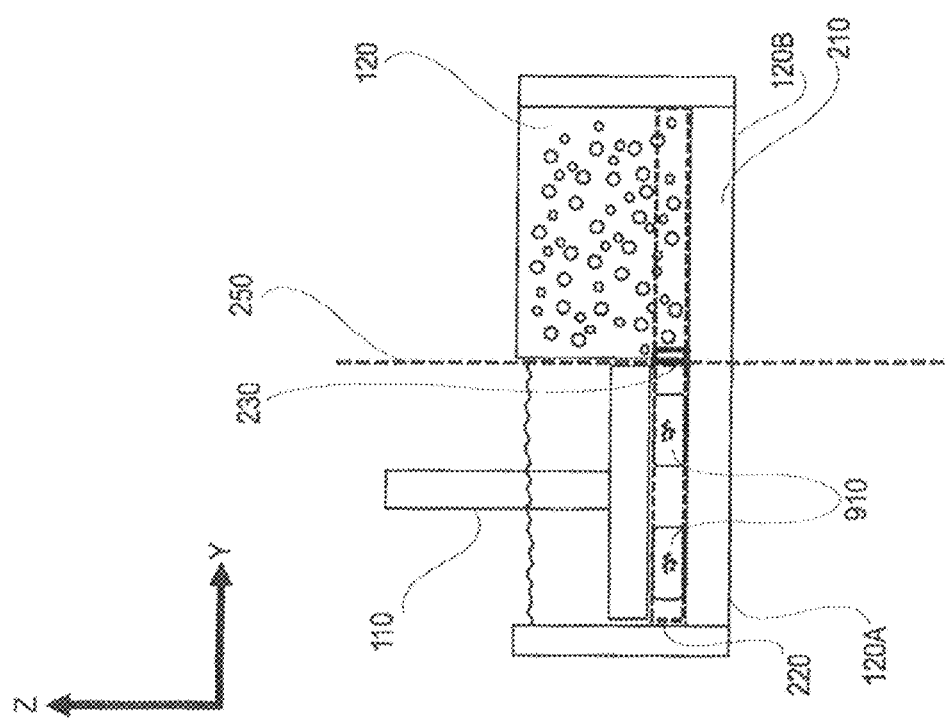

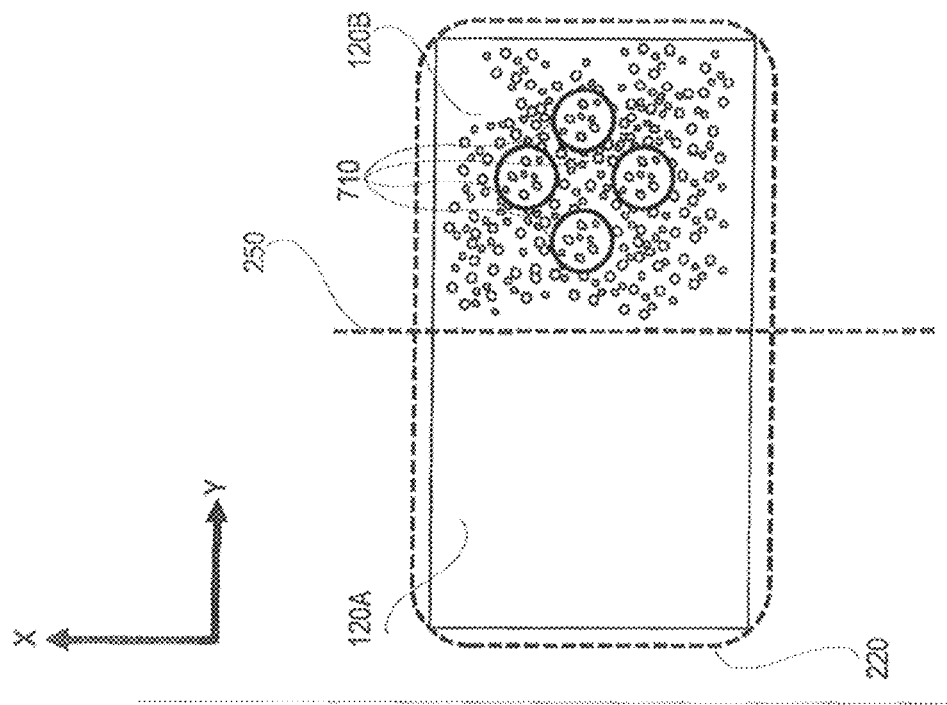
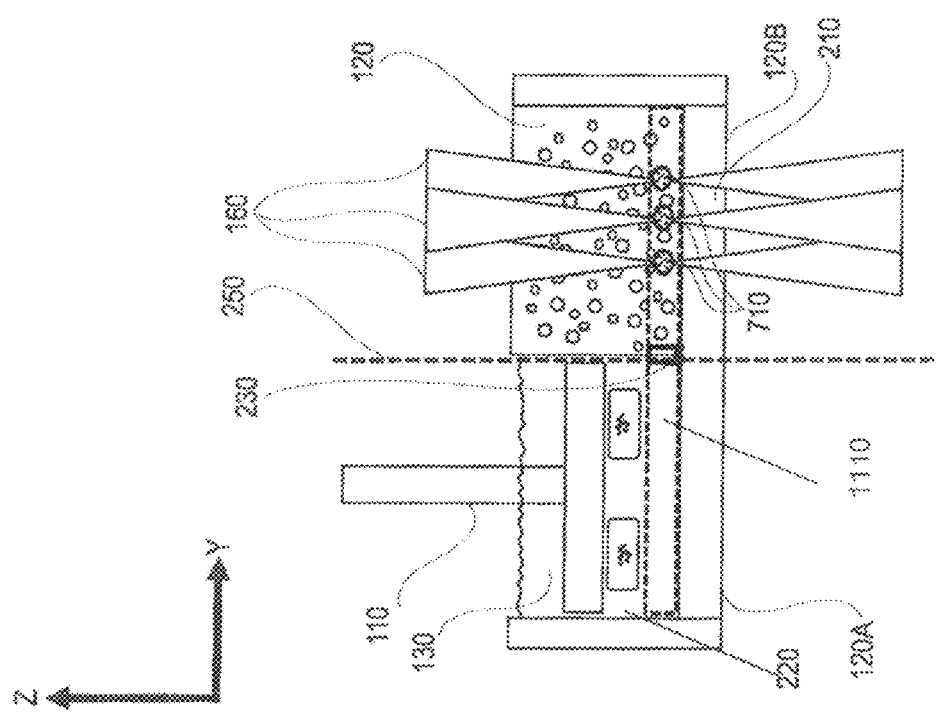

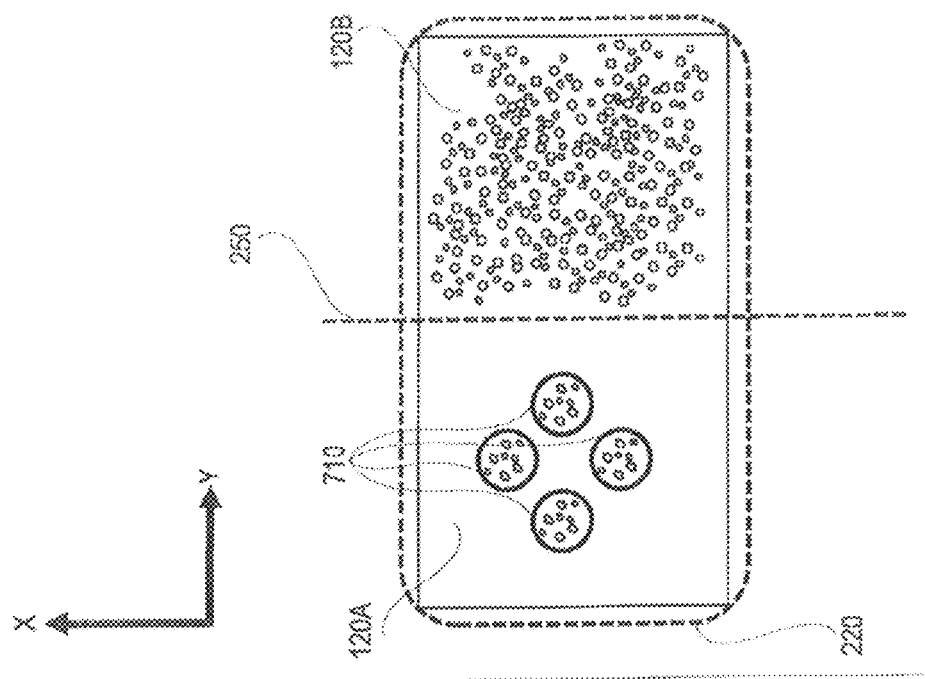
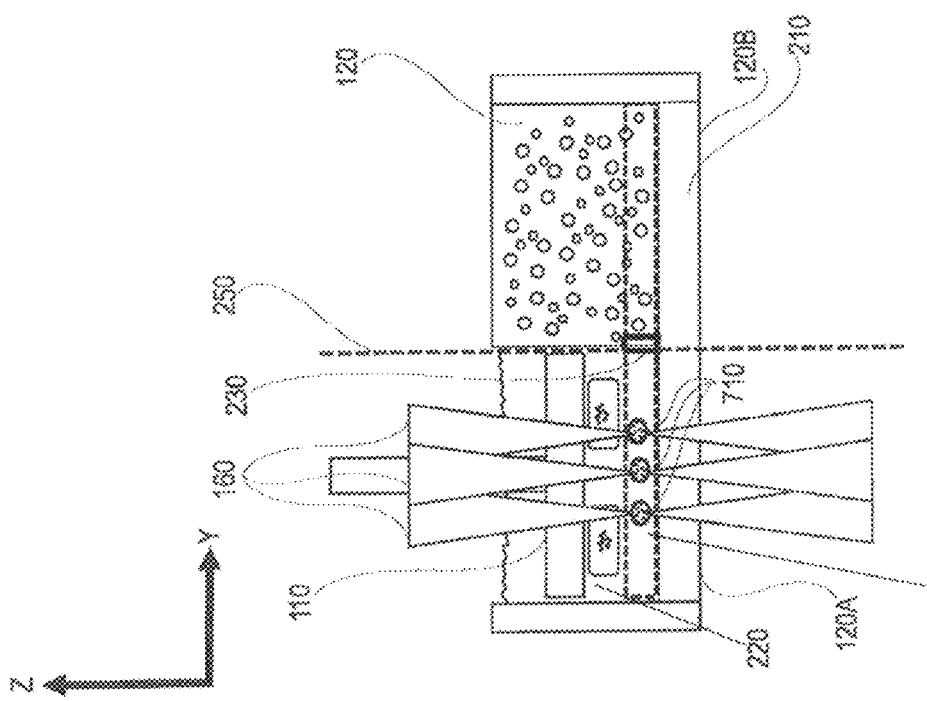
FIG. 13A
FIG. 13B

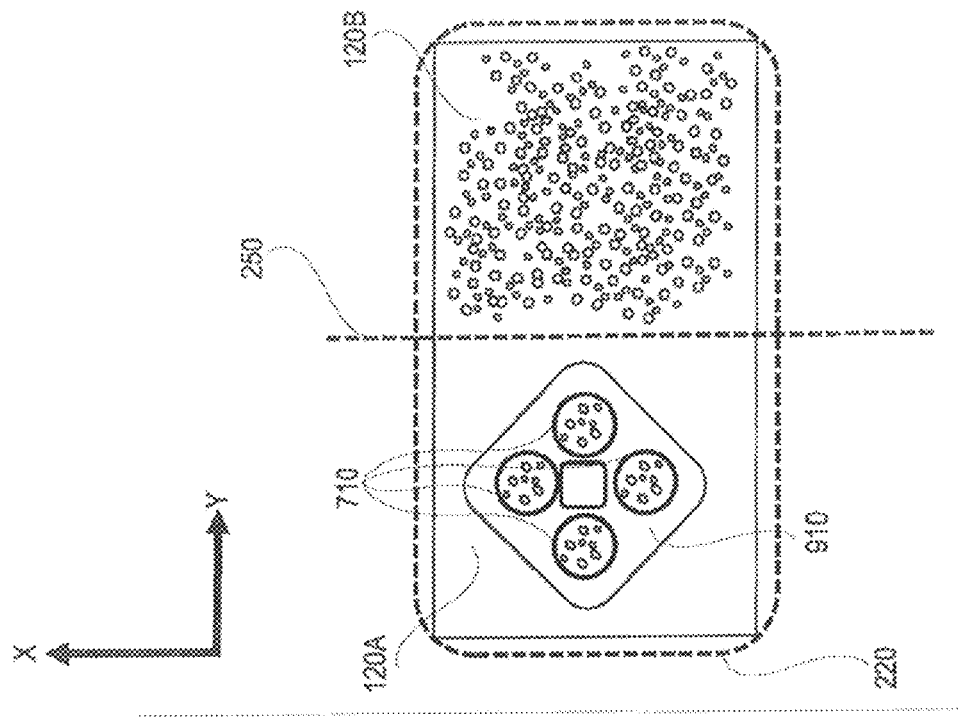
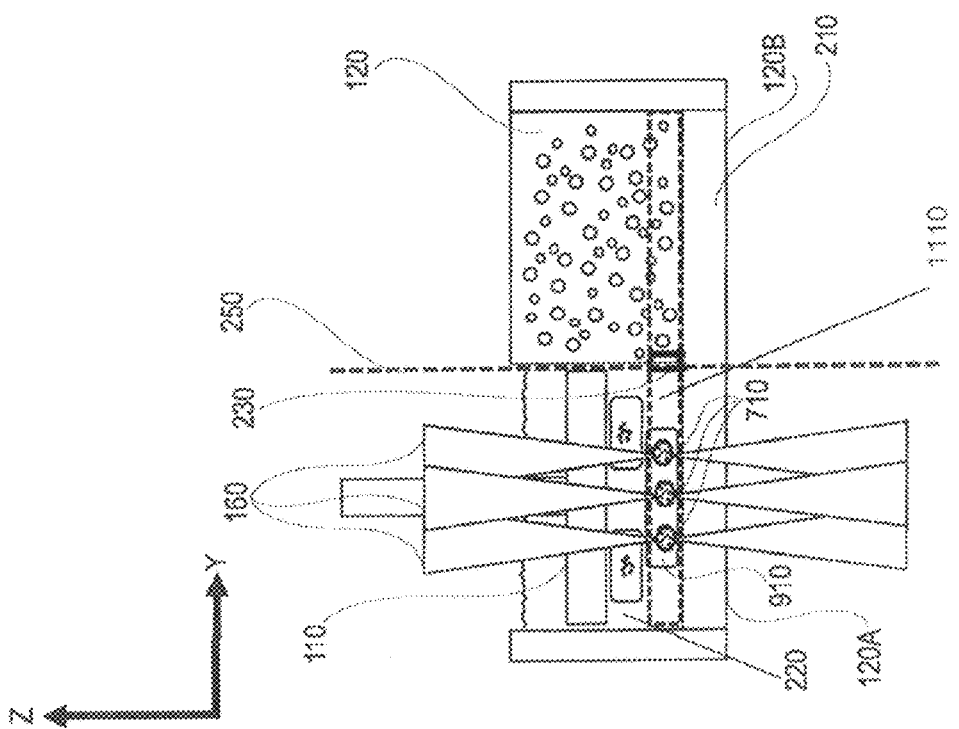

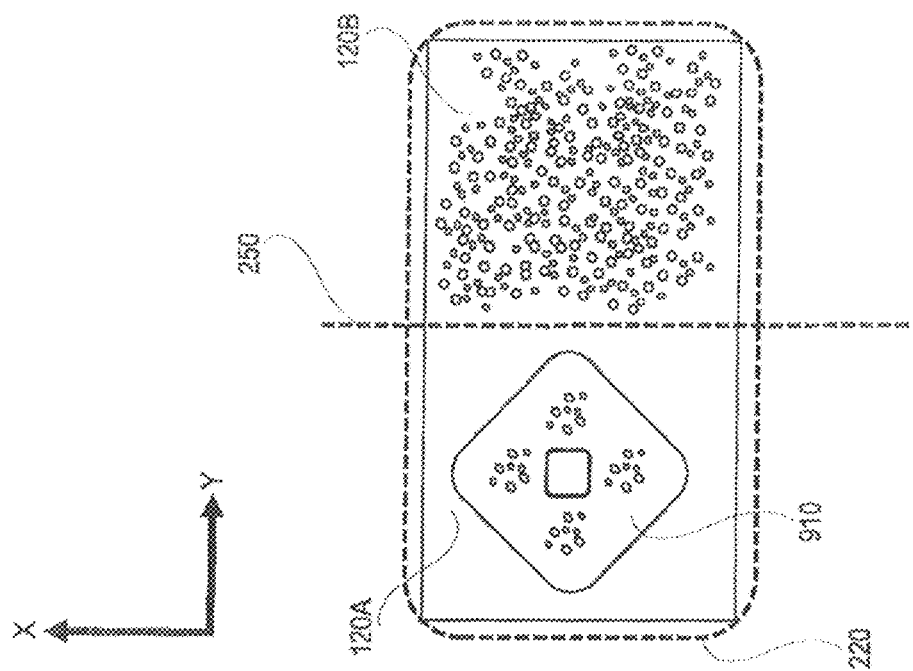
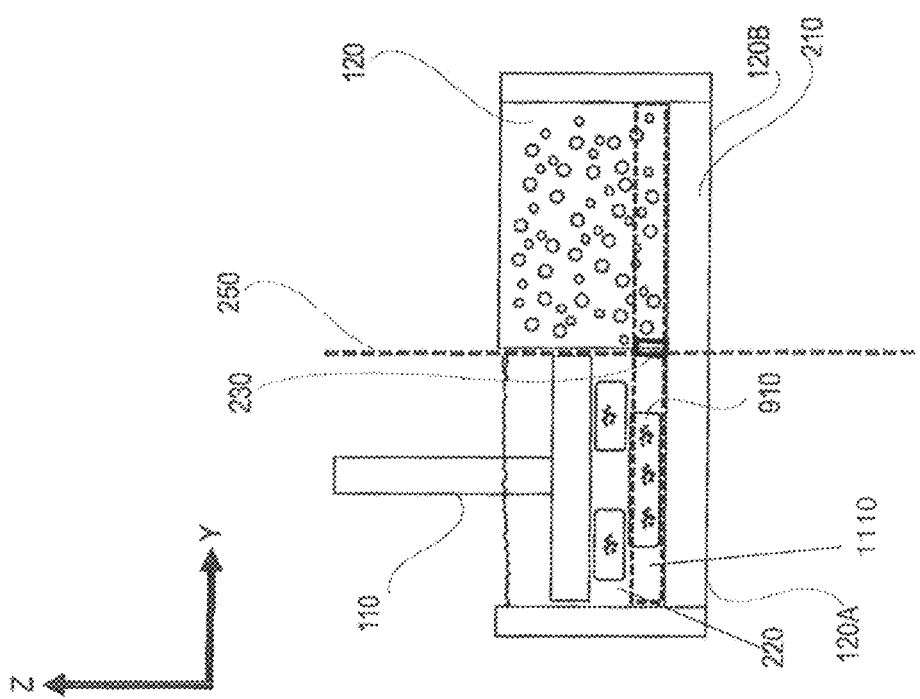

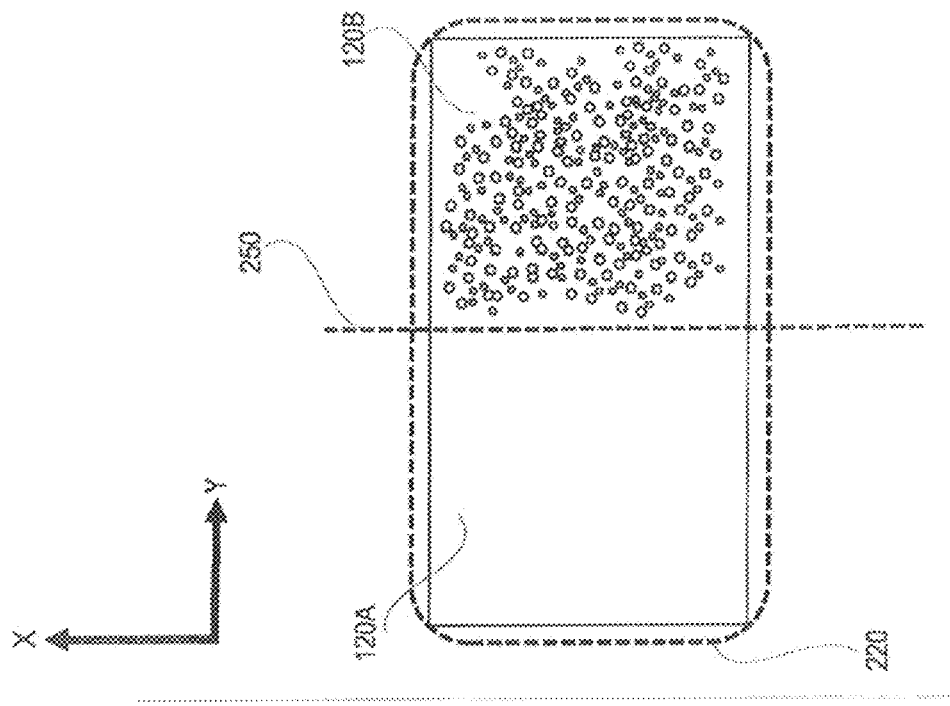
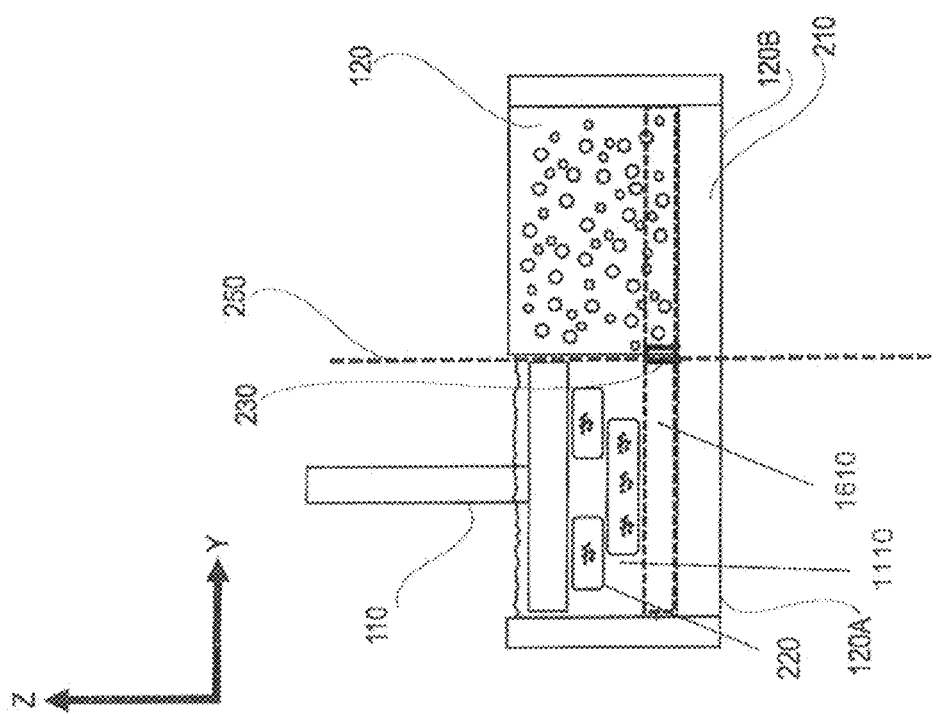

DYNAMIC TISSUE MICROFABRICATION THROUGH DIGITAL PHOTOLITHOGRAPHY SYSTEM AND METHODS

REFERENCE TO RELATED APPLICATIONS

The application incorporates by reference the Provisional Patent Application 62/325,109 that was filed on Apr. 20, 2016, entitled "Dynamic Tissue Microfabrication Through Digital Photolithography" priority of which is asserted.

FIELD OF THE INVENTION

This application relates to the field of additive manufacturing.

BACKGROUND

Light based additive manufacturing methods employ a photo-curable resin in place of a thermal-sensitive filament. This liquid resin contains photosensitive monomers that polymerize when exposed to light of sufficient energy. Light based additive manufacturing methods use stereo lithography a technique where a rastering laser system directs a focused beam throughout a plane in the resin. By defining where the laser will contact the resin, a desired image or pattern can be "drawn" onto a build plate by selective polymerization of the resin in that plane. The pattern "drawn" into the resin is a cross sectional area of one particular layer of the three-dimensional object. By coordinating successive image exposures with incremental motion along an axis normal to the area of the image, an entire three-dimensional object can be fabricated.

Some systems use Digital Light Processing (DLP) and Liquid Crystal Display (LCD) systems as part of additive manufacturing. Digital Light Processing allows one to control an array of micromirrors that, when actuated, reflect light through projection optics. The result is a digital mask where each micromirror represents one pixel of a particular image. The implication is that now an entire cross sectional area of resin can be exposed at once, which reduces the time it would take to produce one layer of the object. Additionally, this method provides higher spatial resolution, since the spot size of each pixel is generally smaller than the spot size of a traditional stereo lithography laser.

Again, the coordinated exposure of successive images with the progressive motion of the build plate allows a three-dimensional object to be created.

BRIEF DESCRIPTION OF DRAWINGS

FIG. 6A is an X-axis side view of the build subsystem at the beginning of the fabrication process.

FIG. 6B is a top view of the build subsystem at the beginning of the fabrication process.

FIG. 7A is an X-axis side view of the build subsystem showing the light trapping of the particles.

FIG. 7B is a top view of the build subsystem showing the light trapping of the particles in the particle reservoir.

FIG. 8A is an X-axis side view of the build subsystem showing the movement of the particles from the particle reservoir to the build resin vat.

FIG. 8B is a top view of the build subsystem showing the movement of the particles from the particle reservoir to the build resin vat.

FIG. 9A is an X-axis side view of the build subsystem showing the placement of 10 the particles in the build resin vat.

FIG. 9B is a top view of the build subsystem showing the curing of the surrounding substrate to bind in the build resin vat.

FIG. 10A is an X-axis side view of the build subsystem during the photocuring step of the particles in the build resin vat.

FIG. 10B is a top view of the build subsystem photocuring step of the particles in the build resin vat.

FIG. 12A is an X-axis side view of the build subsystem showing the light trapping of the particles for the next layer.

FIG. 12B is a top view showing the light trapping of the particles for the next layer.

FIG. 13A is an X-axis side view of the build subsystem showing the movement of the particles from the particle reservoir to the build resin vat of the next layer.

FIG. 13B is a top view of the build subsystem showing the movement of the particles from the particle reservoir to the build resin vat of the next layer.

FIG. 14A is an X-axis side view of the build subsystem showing the placement of the particles in the build resin vat of the next layer.

FIG. 14B is a top view of the build subsystem showing the curing of the surrounding substrate to bind in the build resin vat of the next layer.

FIG. 15A is an X-axis side view of the build subsystem during the photocuring step of the particles in the build resin vat of the next layer.

FIG. 15B is a top view of the build subsystem photocuring step of the particles in the build resin vat of the next layer.

FIG. 16A is an X-axis side view of the build subsystem illustrating the lifting of the subsequent layer in the build resin vat of the next layer.

FIG. 16B is a top view illustrating the lifting of the subsequent layer in the build resin vat of the next layer.

LIST OF SELECTED REFERENCE CHARACTERS

Figure 1:
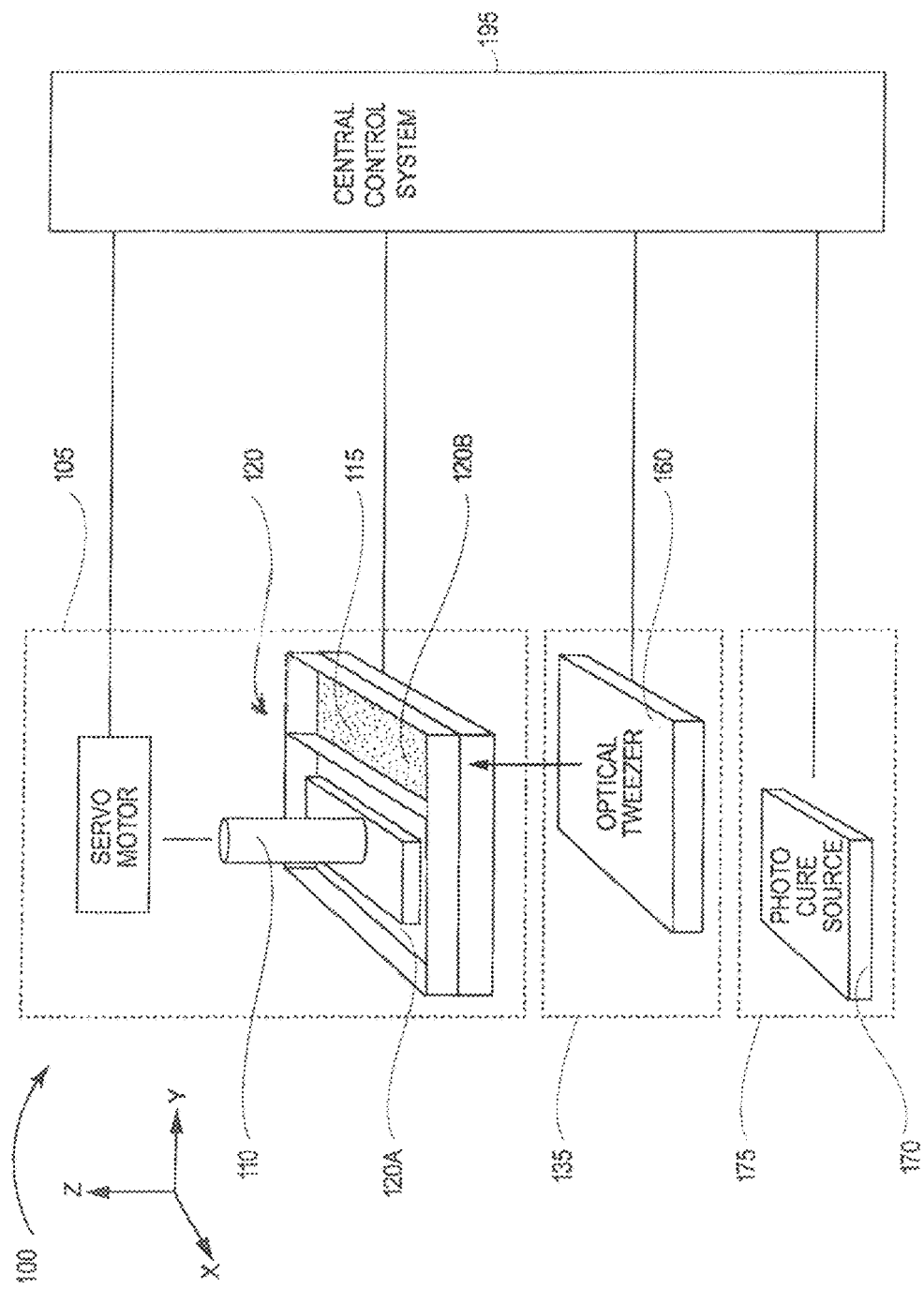
FIG. 1 is a system diagram of the microfabrication system.

100—Three-Dimensional Microfabrication System
105—Build Subsystem
110—Motor controlled build plate
115—Particles
120—Build Area
120 A—Resin Vat
120 B—Particle Reservoir
135—Optical Tweezers Subsystem
160—Optical Tweezers 170—Photo Cure Source
175—Curing Subsystem
195—Control System
210—Transparent Window
220—Focal plane
230—Electronic Gate
240A and 240B—Dichroic Mirrors
250—Imaginary Line of separation
260—Optical path
310—Camera
705—Optical tweezers focal point
710—Optical Traps
910—Digital Pattern
1110—Polymerized layer
1710-1730—Successive Layers formed
1805-1870—Method steps
1900—Three-Dimensional Microfabrication Conveyer System
1910—Servo Motor Tracks
1920—Reservoir tracks
1930—Optical Tweezers Tracks
1940—Photo Cure Source Tracks
1950—Finished Object

DETAILED DESCRIPTION

The following expresses the realization of issues and of means and methods for the discoveries that define the present invention and the several embodiments which derive from those discoveries.

The growing fabrication demands in the field of tissue engineering leads to the quest to produce artificial tissues that adequately mimic native physiology, there are several challenges that must be overcome. Of these include the selection and optimization of material choice, which must be tailored to promote the proliferation of cells to be cultured, and the inherent diffusion limitation that prevents the fabrication of thick biological constructs. In order to fabricate physiologically relevant systems, one must promote the adhesion and survival of the seeded or encapsulated cells and sustain their growing nutrient requirements throughout proliferation. Further, in attempting to best mimic natural tissues, one would also need independent control over the spatial arrangement of both the cells and the materials comprising the construct.

Cells or small particles may be moved and manipulated using single-beam gradient force trap technology or "optical tweezers". Optical tweezers technology has demonstrated the capability to manipulate small particles (and even living cells) in fluid environments against Brownian and bulk fluid motion. Although primarily used for systems such as flow cytometry, microfluidics, and more recently cancer detection, optical tweezers technology has not been applied to any sort of additive manufacturing system in conjunction with light based fabrication systems that incorporate DLP, SLA, or TPP (two photon polymerization) technologies. Also, optical tweezers technology may incorporate a spatial light modulator that allows for a single laser beam to be converted into many optical traps. It is possible to manipulate thousands of these optical traps (and therefore thousands of particles) simultaneously by digitally controlling the spatial light modulator.

The use of light based additive manufacturing technology with bioprinting has enabled the direct printing of pre-vascularized tissue constructs with complex microarchitectures. Patent applications include U.S. Pat. No. 7,088,432 issued to Zhang, U.S. Pat. No. 7,568,904 issued to Koyagi, U.S. Pat. No. 9,186,847 issued to Fruth and U.S. Pat. No. 6,416,190 issued to Grier the content of each of the aforesaid patents being incorporated herein by this reference. To properly fabricate artificial tissues, it is not enough to simply incorporate microstructures (vascular channels) within an overall macrostructure, there also needs to be accurate control over the spatial distribution of the various cell and material types incorporated in the tissue structure. In their best embodiments, current additive manufacturing platforms either require separate syringes or separate resin vats for each material or cell-material combination to be printed.

To date, researchers have incorporated perfusable channels to mimic the vasculature of natural biological tissues. By combining additive manufacturing with biocompatible materials, engineers have developed bioprinters that can extrude biomaterial gels through syringe needles, allowing for more complex vascular channels, higher density cell cultures, and the capability to incorporate multiple cell and material types. However despite the control over cell/material arrangements, these extrusion based bioprinting systems are limited in print speed (they must trace a predefined path for each layer), spatial resolution (limited by needle diameter and cell size), and number of cell/material combinations (a new syringe is required for each combination).

In particular, Digital Light Processing based bioprinting has allowed researchers to fabricate tissue constructs much faster, and with The use of light based additive manufacturing methods (SLA, DLP, etc.) for bioprinting has enabled the direct printing of pre-vascularized tissue constructs with complex microarchitectures. much higher spatial resolution than extrusion based printing. The increased spatial resolution is due to the relatively small pixel size, and the faster print speed is attributed to the ability to expose an entire layer of a pattern at once. Although Digital Light Processing based bioprinting has significantly progressed tissue engineering efforts, their largest limitation is the lack of control over cell distributions within a given construct, and the factors that prevent multiple materials from being incorporated in a single build sequence.

To properly fabricate artificial tissues, it is not enough to simply incorporate microstructures (vascular channels) within an overall macrostructure, there also needs to be accurate control over the spatial distribution of the various cell and material types in the construct.

Therefore, there is need for a system and method which could control the composition of an object fabricated by current light based additive manufacturing methods for fabricating hierarchical systems.

The following discussion outlines the technical features and advantages of the presented invention. It should be noted by those skilled in the art that the particular embodiment described provides the foundation for achieving the desired purpose and utility.

It is in the spirit of this invention to combine today's light based additive manufacturing methods with existing optical tweezers technology to accurately position cells or particles within and amongst the pixels of a layer prior to polymerization. The sequential polymerization of subsequent layers allows a macroscopic object to be formed. By controlling the spatial arrangement of particles within each of these layers it becomes possible to fabricate hierarchical systems combining features spanning from macro to microscopic scales.

In a preferred embodiment, a system for digitally controlled light based three-dimensional printing of particles within a substance. In another embodiment, multiple objects can be fabricated by the use of a step conveyor system that positions the build area beneath an optical tweezers.

These and other embodiments are described in more detail in the following detailed descriptions and the figures. The foregoing is not intended to be an exhaustive list of embodiments and features of the present invention. Persons skilled in the art are capable of appreciating other embodiments and features from the following detailed description in conjunction with the drawings.

Now referring to FIG. 1 which illustrates a three-dimensional microfabrication system 100. First, a positioning subsystem 105 mechanically manipulates groups of particles 115 within a build area 120 using a motor-controlled build plate 110. Then, an optical tweezers 160 within an optical tweezers subsystem 135 projects light into the build area 120 which then manipulates and moves particles 115 from one section of the build area, a particle reservoir 120B, to another section of the build area, a resin vat 120A. After movement of the particles 115, a photo cure 170, within a photocure subsystem 175, projects light through the particle reservoir 120B to set the particles within a photo reactive material in one portion of the X-Y plane thereby leaving an X—Y layer. The process is then repeated which allows for the creation of a three-dimensional structure along the Z-axis within each of a plurality of sequentially adjacent X—Y layers incorporating particles set at particular locations in each layer. The subsystems and operation of these subsystems are controlled by a control system 195.

Figure 2:
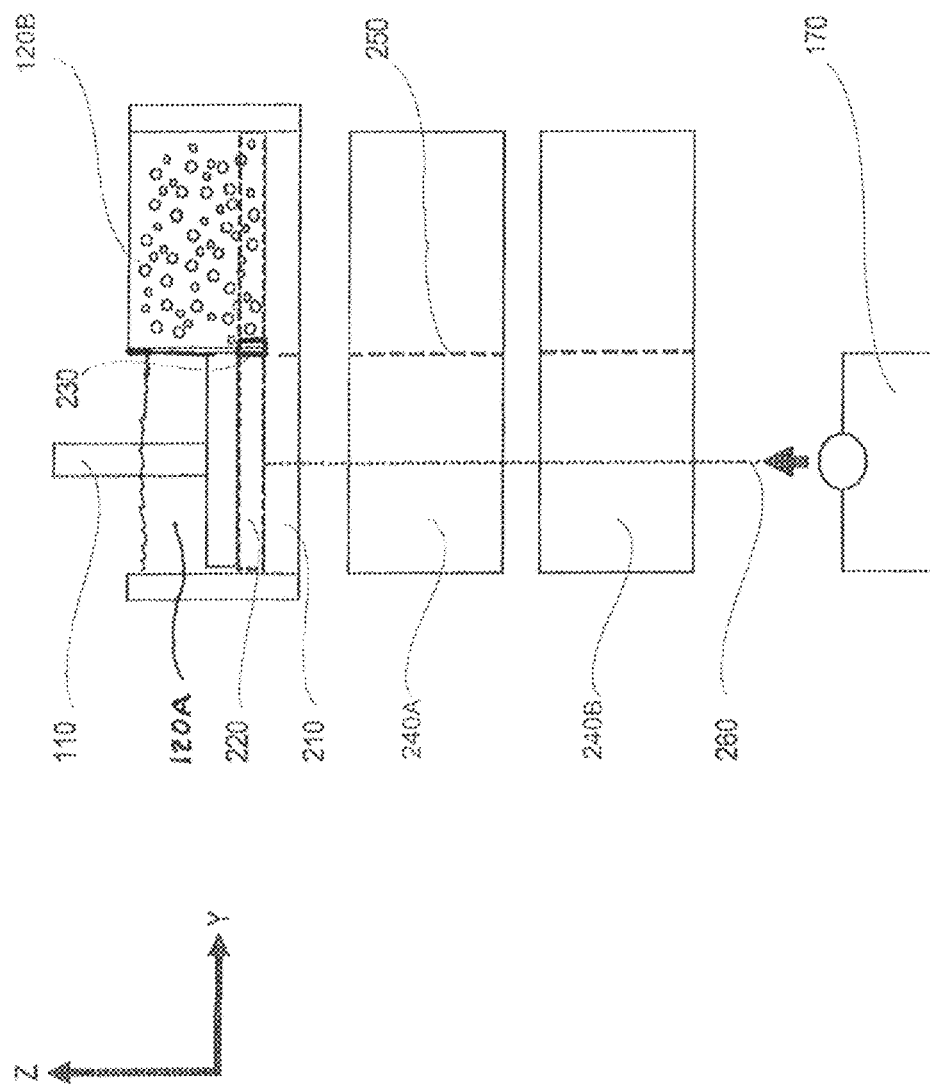
FIG. 2 is an X-axis side view of the build subsystem.
Figure 3:
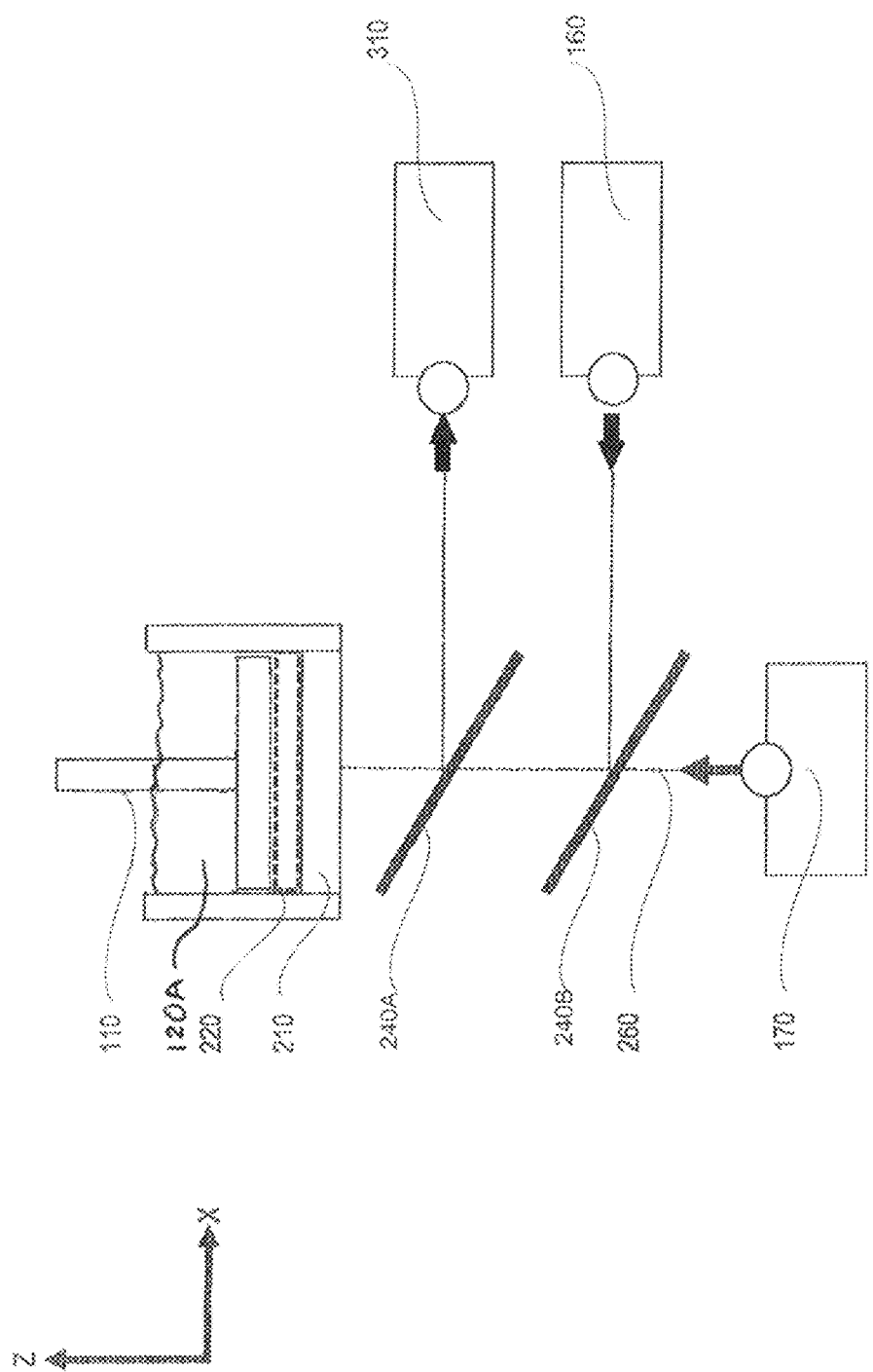
FIG. 3 is a Y-axis side view of the build subsystem.

Now referring to FIG. 2 and to FIG. 3, which are cross sectional views of the three subsystems, the build subsystem 105, the optical tweezers subsystem 135 and the curing subsystem 175. Adjacent to the resin vat 120A is a particle reservoir 120B that features a digitally controlled gate 230 separating the particle reservoir 120Bs from the resin vat 120A. As best seen in FIG. 3. the resin vat 120A and the particle reservoir 120B can be optically aligned with the optical tweezers system 160 (Dichroic mirrors 240A/240B) and the photo cure source 170. The line 250 illustrates a separation between the resin vat 120A and the particle reservoir 120B as viewed by the photo cure source 170 and the optical tweezers 160. In an alternative embodiment, the invention could incorporate a camera 310 to collect light to enable observation of the operation of the system.

Figure 4:
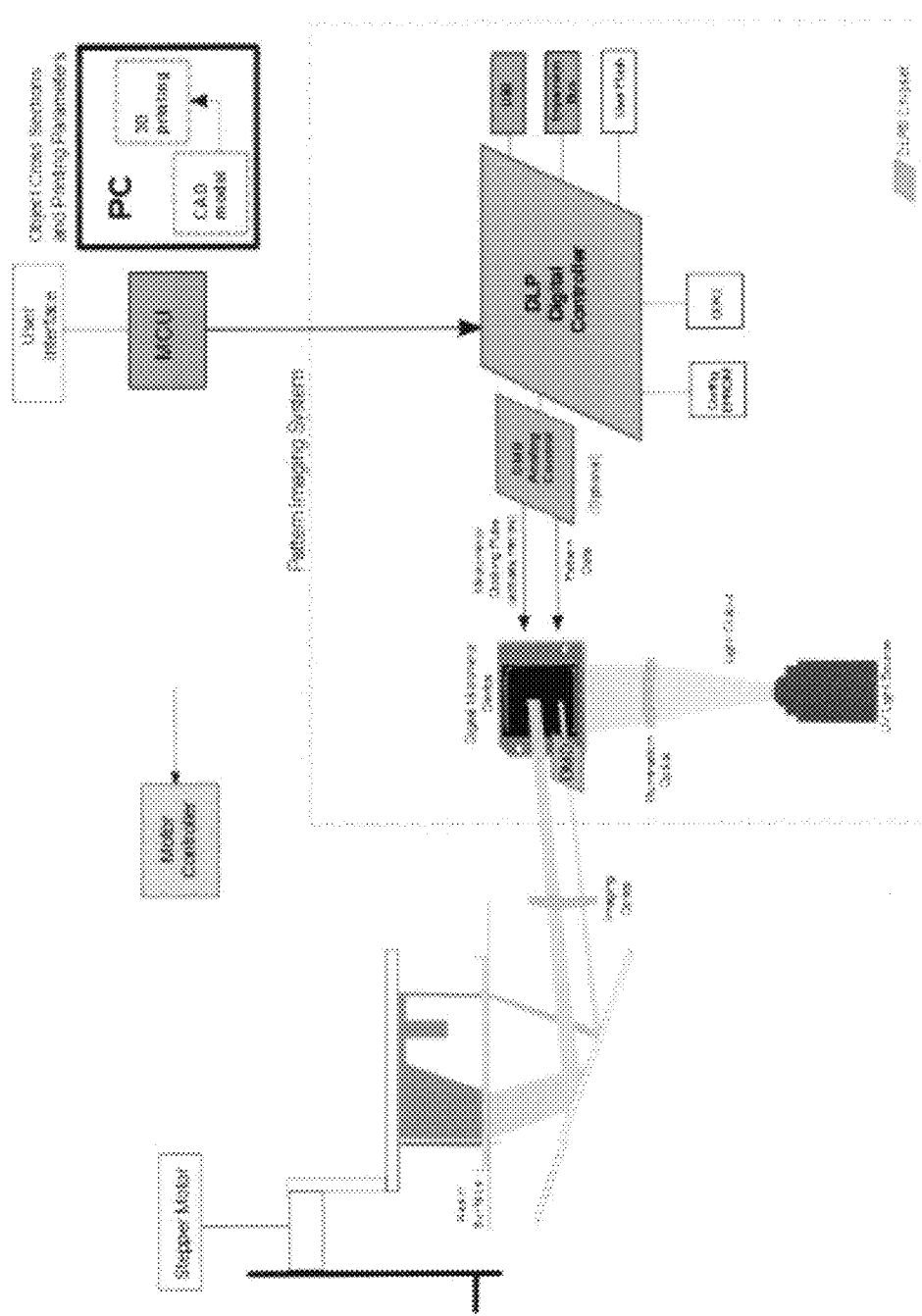
FIG. 4 is a prior art diagram of a Digital Light Processing subsystem.

FIG. 4 shows a system known as the Digital Light Processing (DLP) based additive manufacturing system originally developed by Texas Instruments. The illustrated system provides an example of the Digital Light Processing technology as used for additive manufacturing. The DLP system operation, is now explained. Light of sufficient energy to initiate photopolymerization is shone through a set of illumination optics and onto the surface of a digitally controlled array of micromirrors. Upon actuation, these mirrors bend and reflect a pattern of the incident light through the imaging optics of the projector. Once entering the imaging optics, the pattern is focused onto a desired plane of photo-sensitive resin to initiate selective polymerization.

Figure 5:
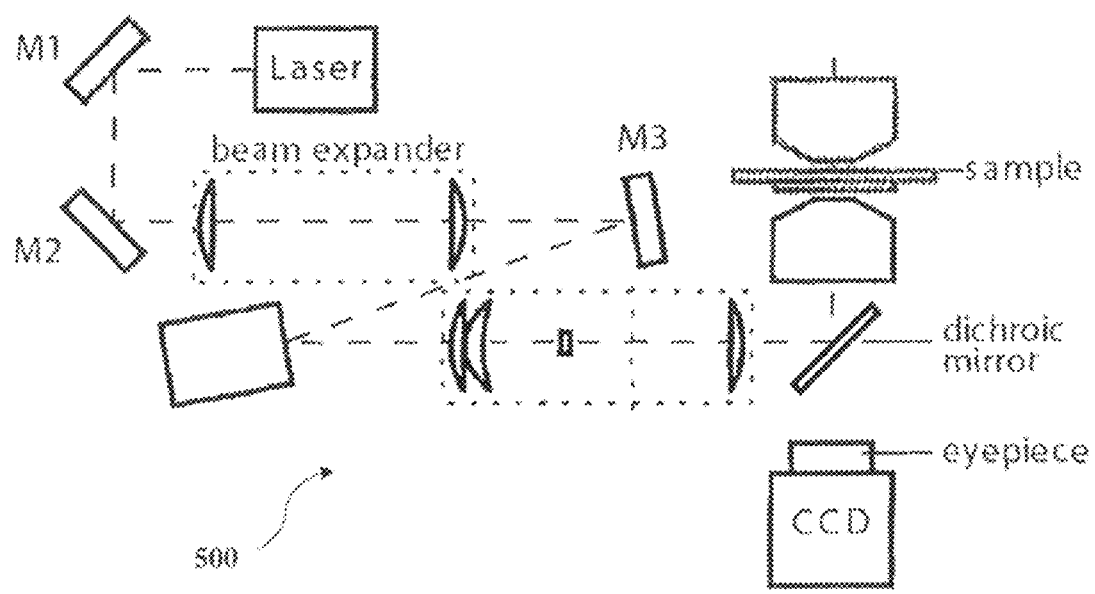
FIG. 5 is a prior art diagram of the optics used in the holographic optical tweezer subsystem.

FIG. 5 illustrates an optical system diagram of a holographic optical tweezers system that can generate a plurality of optical traps from a single laser. In the illustrated design, a laser is reflected by two mirrors (M1, M2) and passed through a beam expander. The enlarged beam is again reflected by a mirror (M3) at a spatial light modulator that creates a computer-designed hologram to split the collimated laser beam into multiple independent beams. The multiple beams then pass through a set of relay optics, and are reflected off of a dichroic mirror. The beams are then passed through a microscope objective which brings them to a diffraction-limited focus, where their electric fields are of sufficient intensity to polarize nearby dielectric objects. Once polarized, these objects are attracted up the intensity gradient of the focused beams, effectively trapping them at the focal point of the beams. While this prior art design is sufficient in producing and viewing a plurality of optical traps, alone it is limited in its fabrication capabilities.

Now referring to FIGS. 6A-16B illustrating the interaction between the major subsystems while showing the process of building a three-dimensional object. In each illustration, two planes are shown in each figure, the YZ plane (A) represents a front view slice of the focal plane 220 shared between the projector and optical tweezers, and the XY plane (B) represents the same focal plane 220 as viewed from below the transparent window 210.

There are two regions in the build area 120 that are separated by a line 250 that represents a border between the region of the resin vat 120A and the particle reservoir 120B. The term "resin" includes, but is not limited to, any type of liquid material that can fix particles and that is photoreactive. The term "particle" refers to any type of particle that can be manipulated by an optical gradient force (such as by optical tweezers)

In the left region of the focal plane 220, within the build area 120A, the projected images (from the photo cure source), capable of initiating selective photopolymerization, align with and span the surface of the area directly below the motor-controlled build plate 110. The right-hand side of the focal plane 220 is in optical alignment with the starting position of the optical tweezers apparatus 160 below the particle reservoir.

Now referring to FIG. 6A and FIG. 6B which show the resin vat 120A filled with photopolymer solution, and the particle reservoir 120B filled with particle suspension solution.

FIGS. 7A and 7B, show the optical tweezers 160 activated to produce a plurality of optical traps 710 at the focal point 705 of each beam. within the shared focal plane 220, thereby causing local particles to be held by the optical traps 710.

FIGS. 8A and 8B show the motor-controlled translation of the optical traps 710 synchronized with the opening of the electronic gate 230, moving the trapped particles into the desired position below the build plate 110. The electronic gate 230 in one embodiments is a physical hinged plate that is electronically actuated as programmed in a computer which is in the central control system 195.

Now referring to FIGS. 9A and 9B, the photo cure source 170 (which can also be referred to as a projector 170) is activated, producing a predefined image that selectively polymerizes a desired pattern 910 onto the build plate 110, the transported optical traps with the particles contained therein then become integral to the resulting layer. The optical tweezers system is deactivated in coordination with the photopolymerization action by the projector 170 such that the trapped particles have had enough time to be encapsulated by the surrounding polymer. This is illustrated in FIGS. 10A and 10B showing the digital pattern 910 as polymerized into the focal plane 220.

Figure 11A:
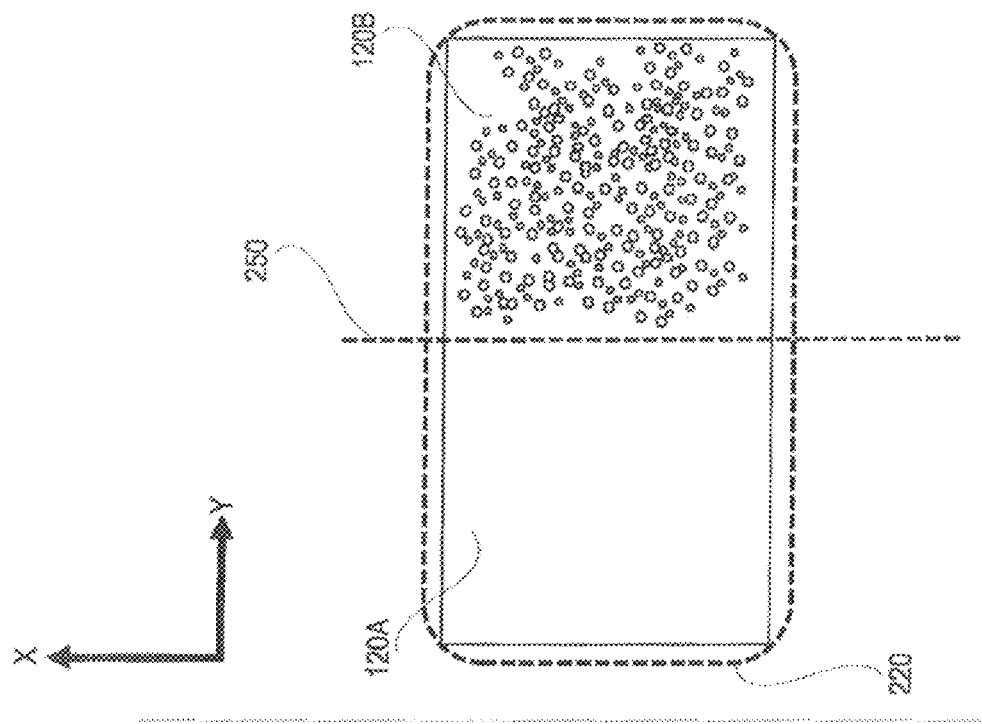
FIG. 11A is an X-axis side view of the build subsystem illustrating the lifting of the subsequent layer in the build resin vat.
Figure 11B:
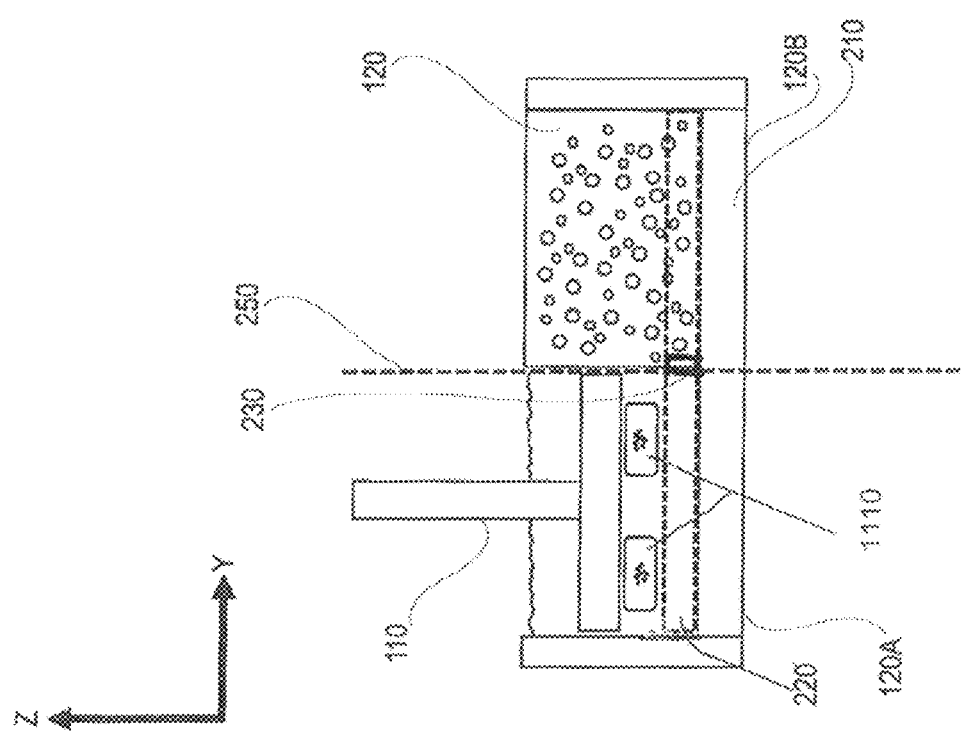
FIG. 11B is a top view illustrating the lifting of the subsequent layer in the build resin vat.

FIGS. 11A and 11B show a subsequent action in the procedure. The build plate 110 has moved upward taking with it the polymerized layer 1110. The focal plane 220 is thereby left open for the next layer.

Figure 17:
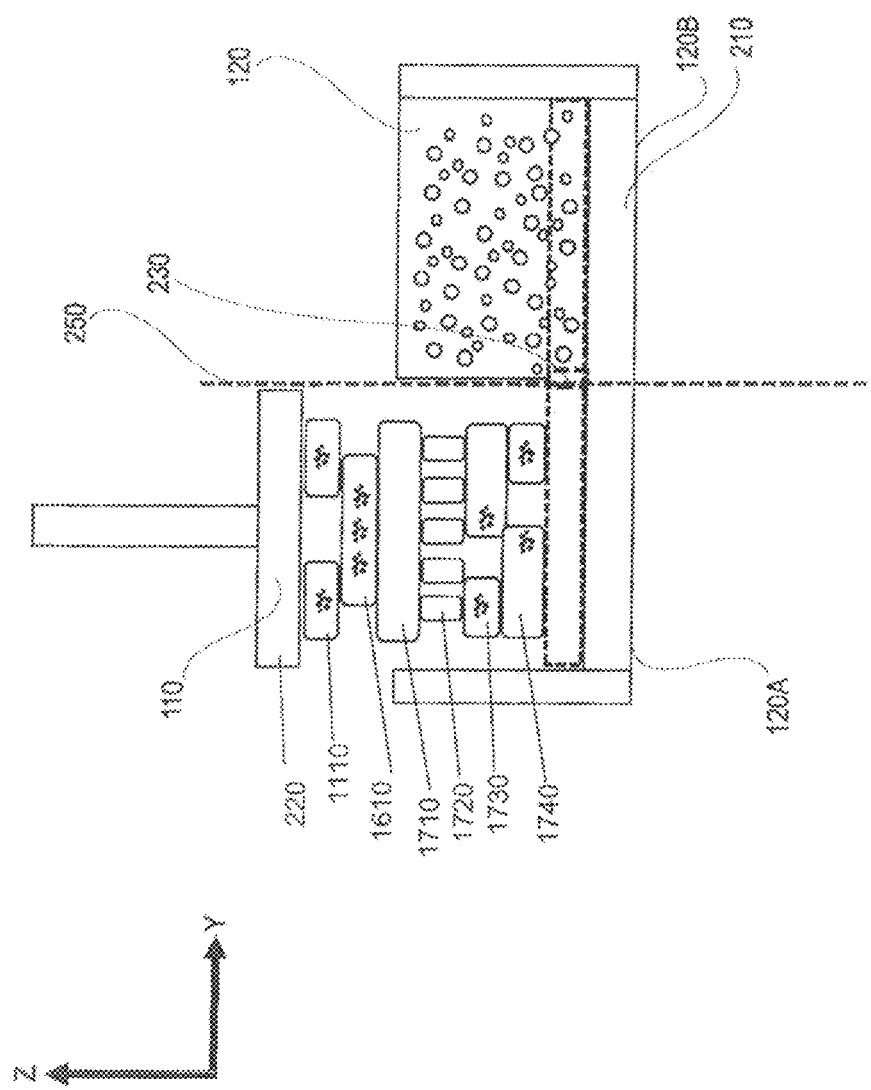
FIG. 17 illustrates the multiple layers after several build steps.

This single layer fabrication process is then repeated for a second layer in FIGS. 12A/B-16A/B. The entire fabrication procedure is essentially a repetition of sequential layers coordinated with incremental motion of the build plate 110 along the Z-axis. FIG. 17 depicts a finished object 1950 printed with seven layers (220, 1110. 1610. 1710. 1720, 1730 and 1740). Each layer is independent of the prior layer. This results in the shape of each polymerized layer. The spatial placement of particles within each layer can be configured differently from layer to layer resulting in the desired shape of the finished object.

Figure 18:
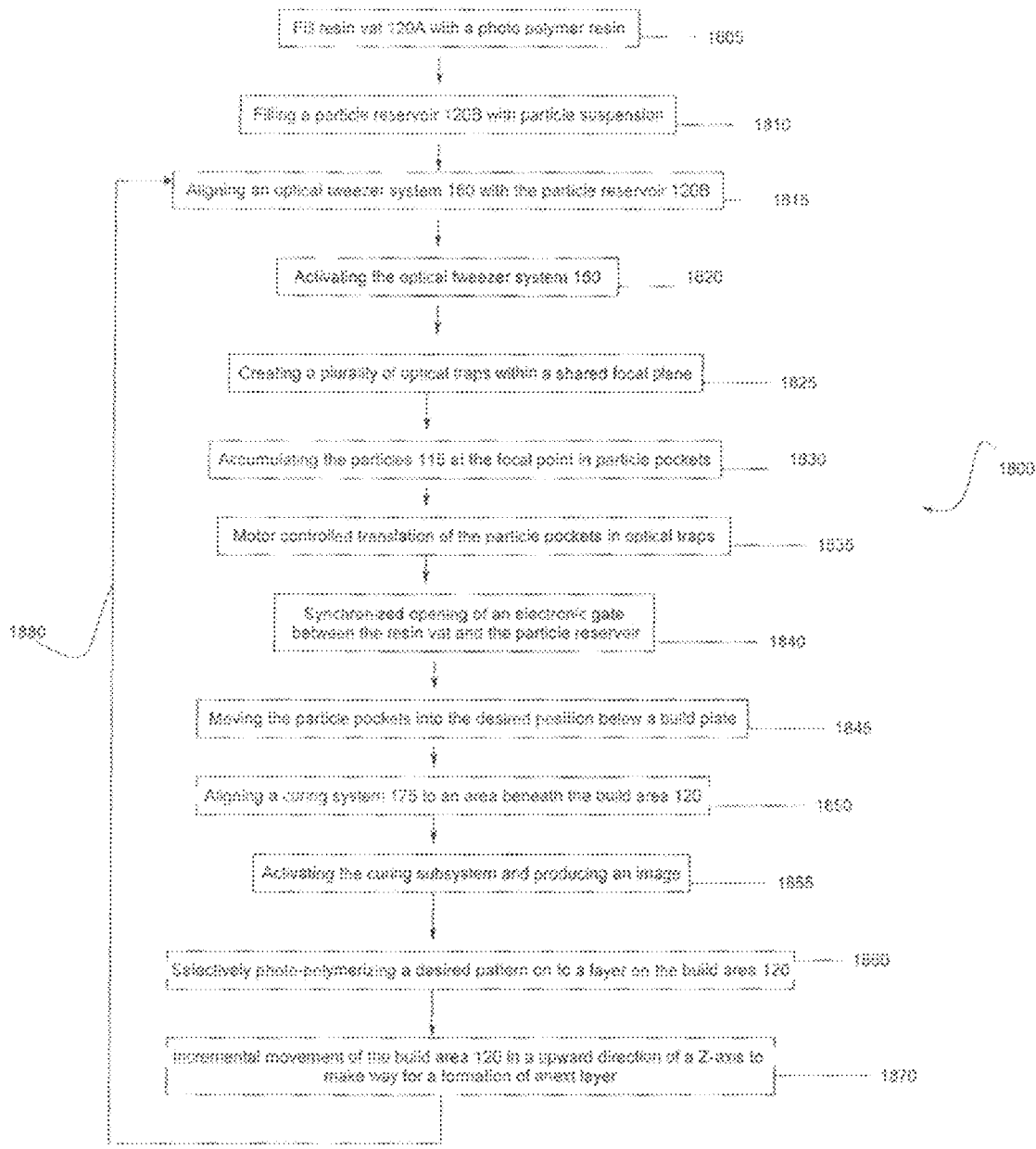
FIG. 18 is the flowchart of the build process.

The entire build process as illustrated in FIGS. 6A/B-16A/B is shown in the flow diagram of FIG. 18. See steps 1805-1870. These steps are operated by a specially programmed computer which operates each element of the system in a coordinated dynamically, optically and chemically controlled manner. The first step is to prepare the build area 120. The resin vat 120A is filled 1805 with a photopolymer resin. The particle reservoir 120B is filled 1810 with particles. The next step is to build a first layer 1110 in the focal plane 220 and then new layers are added sequentially to the form the three dimensional finished object. The optical tweezers 160 is aligned 1815 with the particle reservoir 120B. Next the optical tweezers 160 is activated. See step 1820. Next the optical tweezers subsystem which optically traps 710 the particles 115 within the same focal plane. See step 1825. The force of each beam of light in the optical tweezers 160 creates particle pockets that allow the particles to be moved 1830, 1835. The electronic gate 230 is opened which allows the movement of the particles 115 from the particle reservoir 120B to the resin vat 120A in the focal plane 220 See steps 1840-1845. Then the curing subsystem 175 is aligned beneath the build area 120. The curing subsystem 175 is activated to produce a predefined image corresponding to the cross section of the layer. Step 1855. A pattern 910 is photopolymerized on the build area 120. See step 1860. The build area 120 is then moved upwards to allow for the next layer to be built. See step 1870. The cycle is repeated, Step 1880, to create each subsequent layer until the final three-dimensional final object it built.

Figure 19:
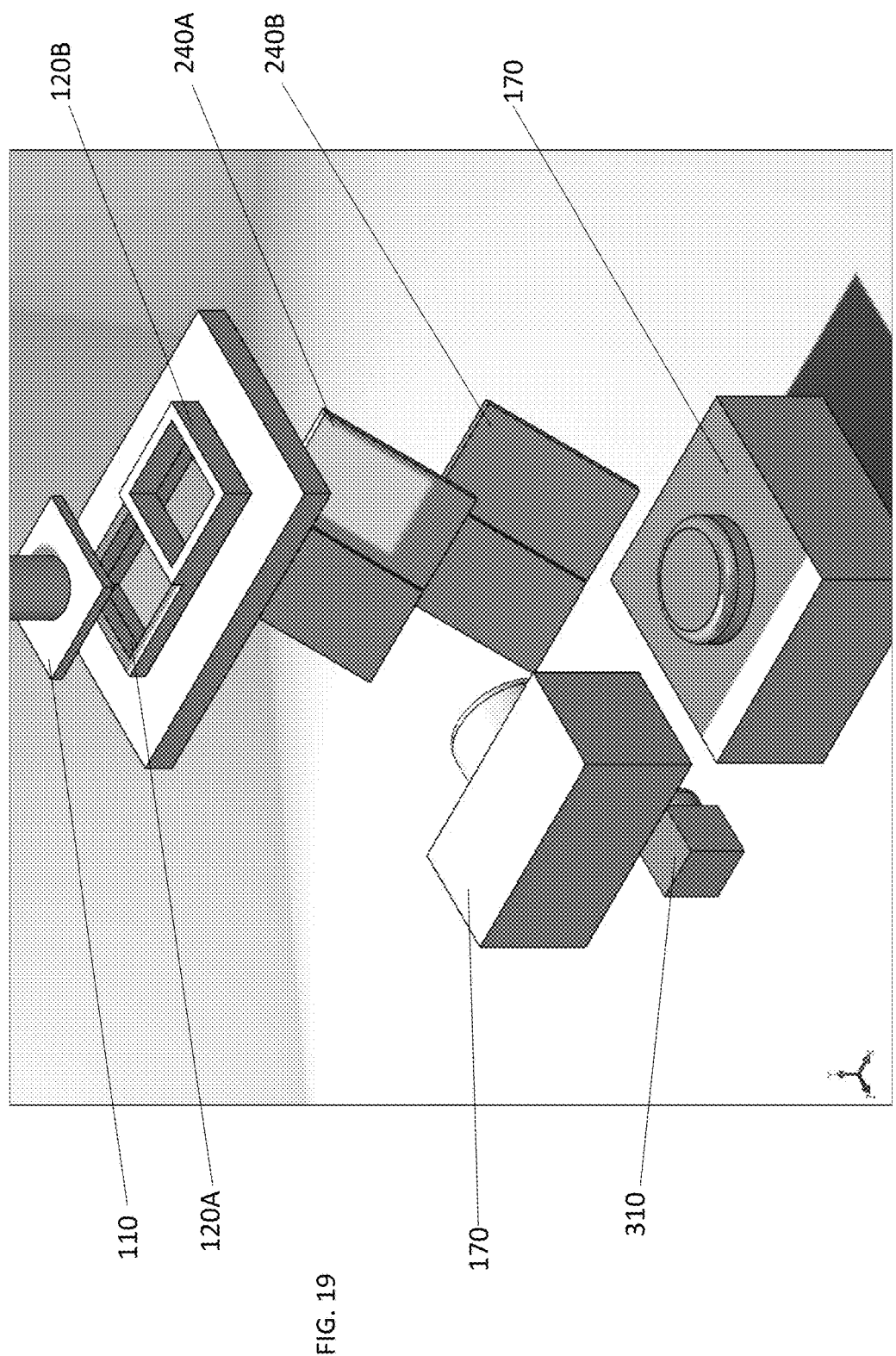
FIG. 19 shows a system to fabricate three dimensional objects featuring the necessary components and their relative spatial arrangements.

An alternate embodiment is illustrated in FIG. 19. In this alternate embodiment, the system would feature a conveyor belt of spatial light modulators synchronized with the other components of the system (which may include multiple resin vats, particle reservoirs, build plates, and DLP projectors. The conveyor system has servo motor tracks 1910 that move the entire assembly. Reservoir tracks 1920 move in conjunction with the servo motor tracks 1910. The Optical Tweezers tracks 1930 move in conjunction with the servo motor tracks 1930. The Photo Cure Source Tracks 1940 likewise move in conjunction with the optical tweezers tracks.

In an exemplary embodiment, a projector containing a Digital Micromirror Device (DMD), for example, the Texas Instruments DLP Lightcrafter 4500 evaluation module. is used as the photo cure source (or projector). This module is a programmable DLP projector featuring the DMD with over one million controllable micro-mirrors. This embodiment is not limited to this particular module, as any projector capable of illuminating a desired area with patterned light of sufficient energy could be utilized as well (including LCD based light modulators).

The major advantages of this invention are (i) the method allows for use of optical tweezers for creating optical traps to position particles prior to the photopolymerizing exposure of each layer, (ii) coordination of a pattern from the optical source with the optical traps moved into a focal plane (iii) the incorporation of a linear build stage that can get sufficiently large to span macroscopic length scales, and (iv) the incorporation of a projector capable of focusing patterned light onto that build stage.

Now referring back to FIG. 1. The control system 195 is built using software and a user interface is required to coordinate the optical tweezers subsystem 135, the curing subsystem 175, and the build subsystem to operate this and the light based additive machine. This software can be written in any of the commercially available software packages and may consist of customer software specifically written for the controllers, and/or the integration of software libraries that have been already written to control the key functions of these subsystems.

This software may allow the user to design a three-dimensional object or, in the alternate, load an existing three-dimensional object file. This file is then digitally sliced, or processed, into layers representing the object's cross section. The interface will then allow a user to select amongst the pixels of the cross section and assign appropriate cell or particle placements. The software will then coordinate the movement of motors that may control the build stage, optical traps, and/or DLP system with the polymerizing images and optical trap patterns to accurately arrange particles from their respective reservoirs within and amongst the pixels of the image to be polymerized.

By incorporating multiple resin vats, several materials may be used in one build sequence, by incorporating multiple particle reservoirs with each resin vat, multiple particle/material combinations can be utilized, and by arranging the optical traps in a conveyor belt arrangement, we can synchronize and optimize an entire build process in a scalable and practical way.

It can be appreciated by ordinary skill in the art that photopolymerizable materials can be chosen from a number of photo-crosslinkable hydrogels and biomolecules. Common photopolymers used in tissue engineering include: poly(ethylene glycol) diacrylate (PEGDA), gelatin methacrylate (GelMA), and hyaluronic acid methacrylate (HAMA). Other photopolymers can be synthesized by incorporating these methacrylate and diacrylate groups into larger biomolecules (for example, methacrylated alginate). Photopolymer resins commonly used in 3D printing, but not in conjunction with biological systems include: acrylic, epoxy, and polyurethane. There is also potential to make electrically conductive polymers that are photo-sensitive. It should be noted that a photo-initiator is commonly mixed with these resins to initiate the photopolymerization reaction. For tissue engineering applications, various cell types will be the particles to assemble within each layer. Using the same embodiment, we should be able to move cells, dielectric particles, and metallic particles. But micrometer and even nanometer sized particles can be used with optical tweezers, the optical parameters would just vary based on their size and dielectric properties.

The thickness of each layer varies based on the exposure time of the UV light with the resin. To achieve layers roughly 50 micrometers thick would require an exposure of roughly one to five seconds, but this can also be tuned based on the wavelength and intensity of the light. Typical wavelength to trap and move cells is 1064 nm at 100 mW, due to its biological amiability. But of course, this can be tailored to the particle size and composition.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A system for a digitally controlled light based three-dimensional printing of an object comprising:
   a computer operable to generate and control the fabrication of a threedimensional object using digital data of an object and a first specific pattern for particles located within a first layer of the object;
   a projector optically aligned with a build plate;
   a resin vat containing a photopolymerizable resin separated by an electronic gate with a particle reservoir;
   the particle reservoir optically aligned with a holographic optical tweezer, the optical tweezer upon activation capable of producing a plurality of optical traps leading to an accumulation of particles at a focal plane of the optical tweezers in the particle reservoir and capable of moving the optical traps from the particle reservoir to a desired location in the resin vat;
   the projector capable of producing a digital image of desired composition in a layer and selectively photopolymerizing a layer of the resin with a desired pattern.

2. The system as described in claim 1, wherein the resin vat has a transparent window to expose a layer of a photopolymer with an image from the projector.

3. The system as described in claim 1, further incorporating a camera to collect light reflected from a shared optical plane.

4. The system as described in claim 1, further wherein the optical tweezer upon activation is capable of moving particles from the particle reservoir to the desired positions according to the first specific pattern, below the build plate via the electronic gate.

5. The system as described in claim 1, wherein the build plate has an access to a coordinated incremental motion along a Z-axis for fabrication of the object in sequential layers.

6. The system as described in claim 1, wherein the build plate incrementally moves in the Z-axis and prepares for fabricating a second layer with a second specific pattern for particles located within a second layer of the object.

7. The system as described in claim 1, wherein the optical alignment is achieved through an arrangement of dichroic mirrors.

8. The system as described in claim 1, wherein the resin vat has a resin selected from a group consisting of polyethylene glycol diacrylate, Gelatin Methacrylate, Hyaluronic acid methacrylate, methacrylate alginate, acrylic, epoxy, polyurethane or photosensitive conductive polymers.

9. The system as described in claim 1, wherein the particles sizes range from micrometer to nanometers and are selected from a group consisting of cells, dielectric particles or metallic particles.

10. A digitally controlled light based method for three-dimensional printing of an object comprising:
    filling a vat with a photo polymer resin;
    filling a particle reservoir with particle suspension;
    aligning an optical tweezer system with the particle reservoir;
    activating the optical tweezer system;
    creating a plurality of optical traps within a focal plane;
    accumulating the particles at the focal plane in the optical traps;
    motor controlled translation of the optical traps;
    synchronized opening of an electronic gate between the resin vat and particle reservoir;
    moving the optical traps into a desired first pattern relative to a build plate;
    aligning a projector system to an area occupied by the optical traps;
    activating the projector and producing an image;
    selectively photopolymerizing a desired pattern on to a first layer on the build plate; and
    moving the build plate incrementally in preparation of formation of a next layer.

11. The method as described in claim 10, wherein the method steps are repeated to build successive incremental layers.

12. The method as described in claim 10, wherein adjacent layers have identical patterns.

13. The method as described in claim 10, wherein adjacent layers have non-identical patterns.

14. The method as described in claim 10, wherein the layer thickness achieved after photopolymerization is in the range of 45 to 55 micrometers.

15. The method as described in claim 10, wherein the time required for achieving the photopolymerization of a layer is 1 to 5 seconds.

16. The method as described in claim 10, wherein a wavelength to trap and move particles is in the range of 1063-1065 nm and 100 mW power.

* * * * *